United States Patent
Tsokos et al.

(10) Patent No.: US 11,017,096 B2
(45) Date of Patent: May 25, 2021

(54) PREDICTION OF SOFTWARE VULNERABILITIES

(71) Applicants: Chris Peter Tsokos, Tampa, FL (US); Nawa Raj Pokhrel, Tampa, FL (US)

(72) Inventors: Chris Peter Tsokos, Tampa, FL (US); Nawa Raj Pokhrel, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 16/427,653

(22) Filed: May 31, 2019

(65) Prior Publication Data

US 2019/0370475 A1 Dec. 5, 2019

Related U.S. Application Data

(60) Provisional application No. 62/679,056, filed on Jun. 1, 2018.

(51) Int. Cl.
*G06F 21/57* (2013.01)
*G06F 16/26* (2019.01)

(52) U.S. Cl.
CPC ............ *G06F 21/577* (2013.01); *G06F 16/26* (2019.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 9,594,913 | B2* | 3/2017 | Serrano | G06F 9/44 |
| 10,268,660 | B1* | 4/2019 | Arazi | A63F 13/50 |
| 2006/0178887 | A1* | 8/2006 | Webber | G10L 15/144 |
| | | | | 704/256 |
| 2007/0237080 | A1* | 10/2007 | Savagaonkar | H04L 63/1416 |
| | | | | 370/235 |
| 2008/0010225 | A1* | 1/2008 | Gonsalves | G06N 7/005 |
| | | | | 706/11 |
| 2008/0098479 | A1* | 4/2008 | O'Rourke | H04L 63/1433 |
| | | | | 726/25 |
| 2009/0077666 | A1* | 3/2009 | Chen | G06Q 10/0631 |
| | | | | 726/25 |
| 2009/0271863 | A1* | 10/2009 | Govindavajhala | G06F 21/577 |
| | | | | 726/23 |

(Continued)

OTHER PUBLICATIONS

Netra Khanal, "Cybersecurity: A Predictive Analytical Model for Software Vulnerability", May 11, 2018, The University of Tampa, Frontiers of Statistics Conference at USF Tampa, FL.*

(Continued)

*Primary Examiner* — Kaveh Abrishamkar
(74) *Attorney, Agent, or Firm* — Thomas Horstemeyer, LLP

(57) ABSTRACT

Aspects of software vulnerability prediction are described. In some examples vulnerability data is obtained from a vulnerability database for the software. The total cumulative vulnerability of the software is estimated using the vulnerability data. The total cumulative vulnerability is based at least in part on a time based nonlinear differential equation model. The time based nonlinear differential equation model generates a complete vulnerability life cycle. A graph is generated to display a cyclic increasing behavior of the complete vulnerability life cycle of the software.

20 Claims, 15 Drawing Sheets

(56) References Cited

U.S. PATENT DOCUMENTS

| | | | |
|---|---|---|---|
| 2016/0078309 A1* | 3/2016 | Feldman | G06T 7/60 |
| | | | 382/131 |
| 2016/0205137 A1* | 7/2016 | Babb | G06F 21/552 |
| | | | 726/1 |
| 2017/0046519 A1* | 2/2017 | Cam | G06N 7/005 |

OTHER PUBLICATIONS

Rajasooriya, S.M., Tsokos, C.P. and Kaluarachchi, P.K. (2017), "Cyber Security: Nonlinear Stochastic Models for Predicting the Exploitability", Journal of Information Security, 8, 125-140. Apr. 30, 2017.*

* cited by examiner

| Operating Systems | Models | RSS | AIC |
|---|---|---|---|
| MAC | RL | 241314.7 | 633.5574 |
| | RE | 262502.3 | 638.2703 |
| | AML | 334296.1 | 653.8092 |
| | PKT | 45584.43 | 529.1156 |
| Linux Kernel | RL | 48998.95 | 578.5852 |
| | RE | 124456.7 | 634.5147 |
| | AML | 78961.47 | 609.2149 |
| | PKT | 18451.8 | 525.987 |
| Windows 7 | RL | 16595.93 | 264.2324 |
| | RE | 22418.38 | 272.6527 |
| | AML | 17965.02 | 268.4519 |
| | PKT | 2808.963 | 220.4948 |

FIG. 9

| Operating Systems | Models | Shaprio-Wilk Test | P-Value |
|---|---|---|---|
| MAC | RL | 0.92423 | 0.002169 |
|  | RE | 0.92273 | 0.001898 |
|  | AML | 0.89681 | 0.000221 |
|  | PKT | 0.96509 | 0.1279 |
| Linux Kernel | RL | 0.96072 | 0.005103 |
|  | RE | 0.9154 | 0.000508 |
|  | AML | 0.942555 | 0.007053 |
|  | PKT | 0.9776 | 0.3858 |
| Windows 7 | RL | 0.90054 | 0.01178 |
|  | RE | 0.92762 | 0.05372 |
|  | AML | 0.96042 | 0.3567 |
|  | PKT | 0.97119 | 0.6128 |

FIG. 13

| Operating Systems | | Q1 | Q2 | 2016 Q3 | Q4 |
|---|---|---|---|---|---|
| Linux Kernel | Predicted Interval<br>Predicted Vulnerability<br>Actual Vulnerability | [1360-1370]<br>1354<br>1366 | [1377-1400]<br>1393<br>1407 | [1416-1452]<br>1433<br>1443 | [1457-1490]<br>1473<br>1502 |
| Windows 7 | Predicted Interval<br>Predicted Vulnerability<br>Actual Vulnerability | [508-554]<br>537<br>535 | [536-602]<br>573<br>569 | [590-650]<br>610<br>596 | [627-710]<br>644<br>642 |
| Mac OS X | Predicted Interval<br>Predicted Vulnerability<br>Actual Vulnerability | [1252-1497]<br>1481<br>1499 | [1516-1614]<br>1534<br>1573 | [1592-1742]<br>1649<br>1656 | [1672-1888]<br>1775<br>1786 |

FIG. 14

| Operating Systems | PKT | RL | SSE RE | AML |
|---|---|---|---|---|
| Linux Kernel | 1603 | 4259.33 | 19850.33 | 13710 |
| Windows 7 | 63.33 | 170.33 | 100.67 | 17404.67 |
| Mac OS X | 2185 | 151100 | 1283800.3 | 2008035.3 |

PREDICTION OF SOFTWARE VULNERABILITIES

CROSS REFERENCE TO RELATED APPLICATIONS

This application claims priority to U.S. Provisional Patent Application Ser. No. 62/679,056, filed Jun. 1, 2018, the entirety of which is incorporated herein by reference.

BACKGROUND

A software vulnerability can be defined as a loophole that allows an attacker to compromise the system. Normally, software can be compromised with respect to the integrity, availability, or confidentiality of the software. All software and Operating Systems (OS) have vulnerabilities, and this scenario is most likely to continue in the foreseeable future. The existence of known vulnerabilities poses extremely high risk to all the stakeholders of the software. Identifying and rectifying every vulnerability present in any software may not be feasible. Software developers and users need to estimate the level of risk produced by the given vulnerabilities, and efficient counter measures need to be implemented. Developers need to stay ahead of the attackers by implementing efficient allocation of resources, adopting ongoing vulnerability testing, and adopting software patch development procedures.

BRIEF DESCRIPTION OF THE DRAWINGS

For a more complete understanding of the embodiments and the advantages thereof, reference is now made to the following description, in conjunction with the accompanying figures briefly described as follows:

FIG. 9 is a table illustrating a comparison of predictive models according to various example embodiments.

FIG. 13 is a table illustrating a model diagnostics of a predictive model according to various example embodiments.

FIG. 14 is a table illustrating predictions of vulnerabilities using a predictive model according to various example embodiments.

FIG. 15 is a table illustrating a sum of square of error (SSE) for predictive models according to various example embodiments.

Figure 1:
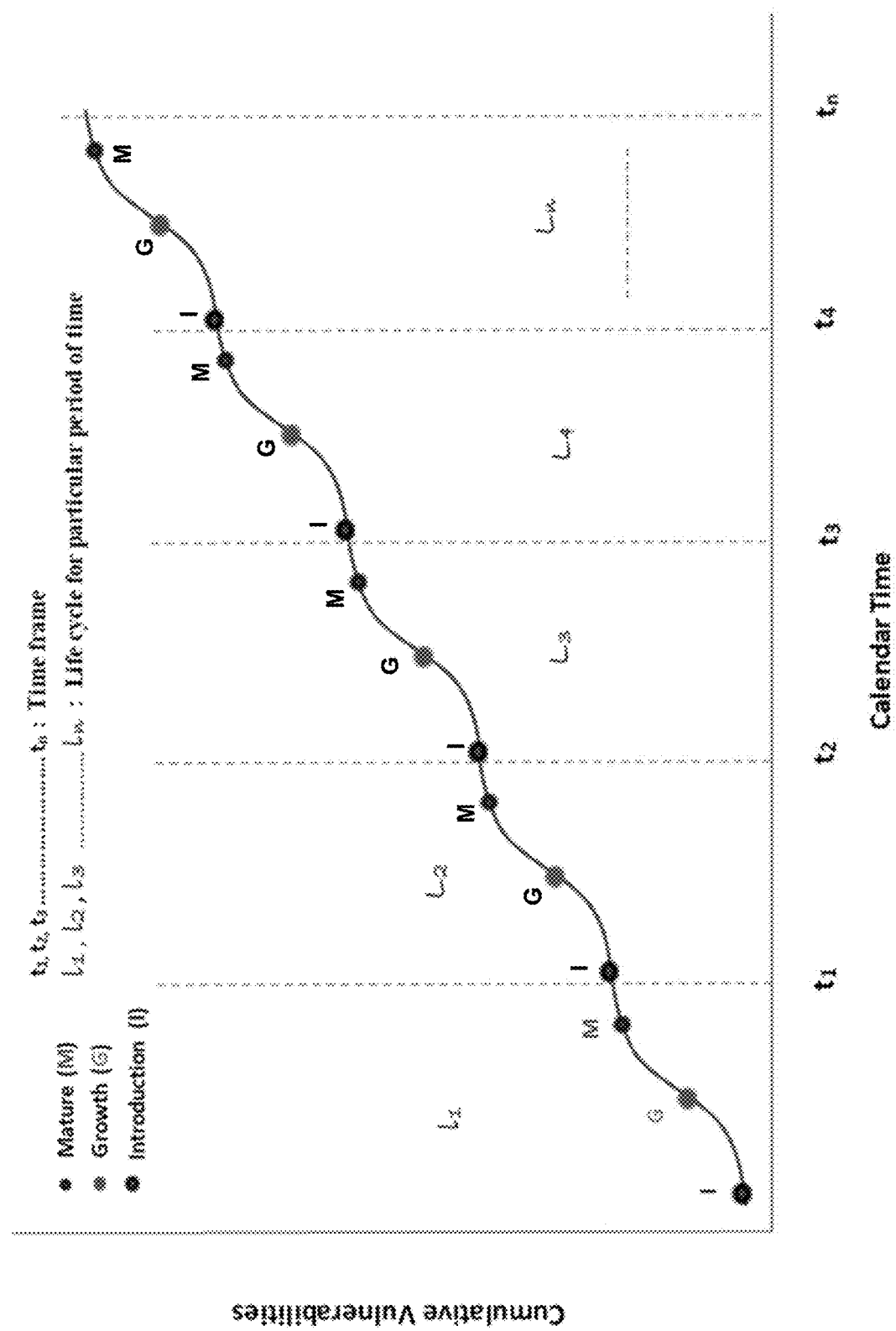
FIG. 1 is a graph illustrating a vulnerability life cycle according to various example embodiments.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

A software vulnerability can be defined as a loophole that allows an attacker to compromise the system. Normally, software can be compromised with respect to the integrity, availability, or confidentiality of the software. All software and Operating Systems (OS) have vulnerabilities, and this scenario is most likely to continue in the foreseeable future. The existence of known vulnerabilities poses extremely high risk to all the stakeholders of the software. Identifying and rectifying every vulnerability present in any software may not be feasible. Software developers and users need to estimate the level of risk produced by the given vulnerabilities, and efficient counter measures need to be implemented. Developers need to stay ahead of the attackers by implementing efficient allocation of resources, adopting ongoing vulnerability testing, and adopting software patch development procedures. On the other hand, end users may invest in intrusion detection/prevention mechanisms and different data safeguard techniques based on requirements of the end users. The investment by developers and users can depend on the level of risk posed by the vulnerability. Thus, the investment can be directly proportional to the level of vulnerability risk involved.

A plethora of research has been conducted focusing on qualitative aspects of vulnerability. However, a need exists to develop statistical models that allow risks of the vulnerabilities to be evaluated quantitatively. Vulnerability models can be used to assess the current security risk along with the estimation of resources required for handling potential security breaches. In addition, a robust model can help to make an informed decision about future releases of software patches and evaluate the risk of vulnerability exploitation. A strong statistical data driven model can provide what best fits the available data and projects future vulnerabilities along with current and future trends based on historical data.

Vulnerabilities can be discovered during the entire life cycle of the software. The vulnerability life cycle can include different transition stages. In the beginning, an increasing rate of vulnerability exists. Once the software is launched in the market, the software can attract the overall share of the installed base customers. If the product is brand new in the market, there can be a higher level of enthusiasm from the customers to buy the product. Once the users are attracted to the software, hackers are also interested to find out the loopholes of the software to gain unauthorized access. When the software is exposed to a greater number of people, hackers also increase their activities, and the total number of vulnerabilities increases at an increasing rate. After some period of time, software developers can become concerned about the security parameters and take necessary actions to improve the system. Therefore, the cumulative effect on the total vulnerability increases slowly. At the final stage, the product can mature with more preventive measures taken by the developers, and at the same time, hackers may lose interest in the product. The users may want to test different software and switch to other new products, and the life-cycle reaches a saturation phase. Most of the researchers have agreed on the aforementioned framework due to simplicity in explanation and analytical tractability.

The present disclosure includes a different perspective in looking at the transition phases of the vulnerability life cycle as explained by FIG. 1. With reference to FIG. 1, shown is a graph illustrating different time frames ranges from $t_1$ to $t_n$, where within each time frame, three transition phases (introduction, growth, and mature) exist locally. These time frames can be a more realistic approach. The combination of three phases for the particular periods of time generates a partial life cycle. In real life, the transition phases exist locally, but with the stability and continuity of the software, the user base increases again and so does the vulnerability. All the partial life cycles from $I_1$ to $I_n$ make a complete vulnerability life cycle. The combination of all of the transition phases and time frames generates a cyclic increasing behavior to explain the entire vulnerability life cycle.

Figure 2:
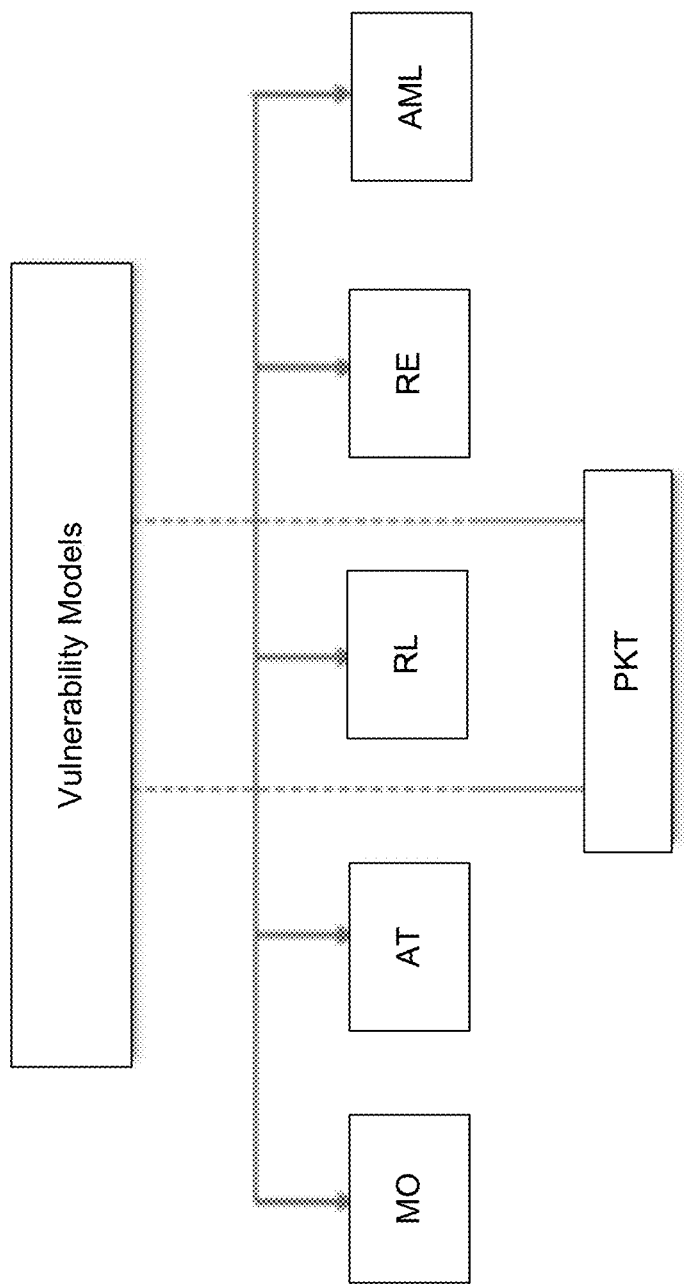
FIG. 2 is a diagram illustrating vulnerability models according to various example embodiments.

There are some available mathematical models, shown in FIG. 2, such as Musa-Okomoto Model (MO), Anderson Thermodynamic Model (AT), Rescorla Linear Model (RL), Rescorla Exponential Model (RE), and Alhazmi-Malaiya Logistic Model (AML) for modeling software vulnerability, but all of these models have limitations. All existing vulnerability models are based on a framework of three transition stages making a complete vulnerability life cycle, but in reality, this is only a partial life cycle.

The existing models shown in FIG. 2 computed model parameters by utilizing three transition phases of the vulnerability life cycle due to simplicity of interpretation and analytical tractability. The Rescorla Linear Model for cumulative vulnerability, given by $\Omega(t)=Bt^2+Kt$, can be obtained from the vulnerability rate $\omega(t)=Bt+K$, where B is the slope, and K is a constant; both regression coefficients and the Rescorla Exponential Model, given by $\Omega(t)=N(1-e^{\lambda t})$, where N is the total number of vulnerabilities and A is the rate constant, failed the goodness of fit test for Windows 95 cumulative vulnerability data. Models, such as RL, RE, and AT, failed the goodness of fit tests except the AML model. The AML model is given by $$\Omega(t) = \frac{B}{BCe^{-ABt}+1}.$$

The AML model assumes that the vulnerability discovery rate increases at the beginning, reaches a steady rate, and then starts to decline. The AML model is suitable only for one partial life cycle, but when there is a cyclic increasing behavior of many partial life cycles, the AML model fails to model the situation.

The present disclosure proposes a new time based nonlinear differential equation model given by:

$$\Omega''(t)+w^2\Omega(t)=f(t), \quad (1)$$

where $\Omega(t)$ can be the cumulative vulnerability count at time t, and f(t) can be the quadratic forcing term. A general solution of the differential equation 1 can be given by:

$$\Omega(t)=c_1\cos(\omega t)+c_2\sin(\omega t)+c_3t^2c_4t+c_5, \quad (2)$$

where $c_1, c_2, \ldots, c_5$ can be the coefficients that derive the model. Model 2 can be considered the final mathematical model, named Pokhrel-Khanal-Tsokos differential equation model (PKT Model) or vulnerability model. The vulnerability model can be compared with the existing ones shown in FIG. 2 in terms of fitting and prediction accuracy. The parameter estimation and their significance are discussed in a homogeneous manner using Nonlinear Regression methodologies. Quarterly data can be used from the National Vulnerability Database of three Operating Systems (OS): Windows 7, Mac OS X, and Linux Kernel.

Figure 3:
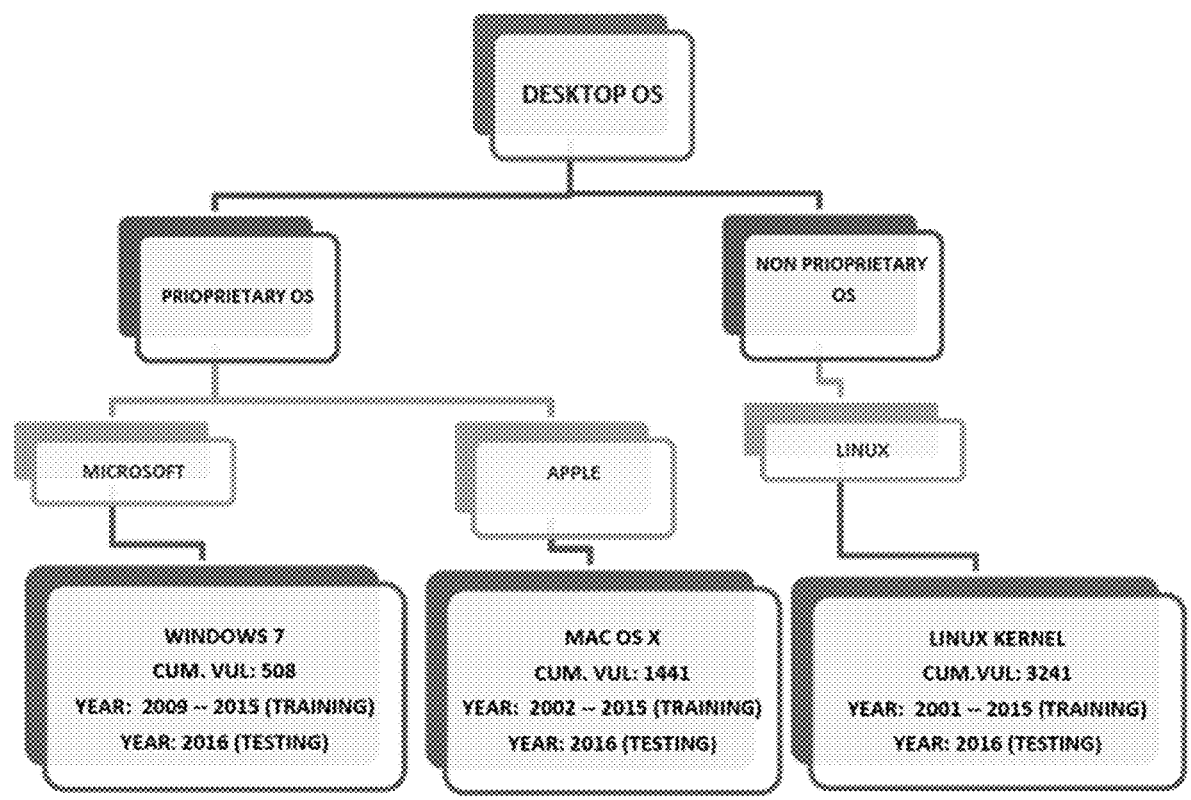
FIG. 3 is a diagram illustrating classifications of operating systems according to various example embodiments.

The schematic network of desktop Operating Systems, shown in FIG. 3, displays a proposed layout of the process that software releases follow. In broad classification of the types of OS, two Operating Systems exist in the market as described in FIG. 3. A private company who, in particular, conceptualizes, designs, and sells proprietary Operating Systems, does not share the source code to the public. Microsoft and Apple are the two giant companies developing proprietary desktop Operating Systems. Similarly, Linux develops one of the nonproprietary desktop Operating Systems referred to as Linux Kernel. The vulnerabilities for each Operating System were collected, with the earliest available data from NVD to December 2015 as training data. However, the whole one year data for 2016 can be considered as testing data to validate the PKT model. The total vulnerabilities over a quarterly period were summed.

Figure 4:
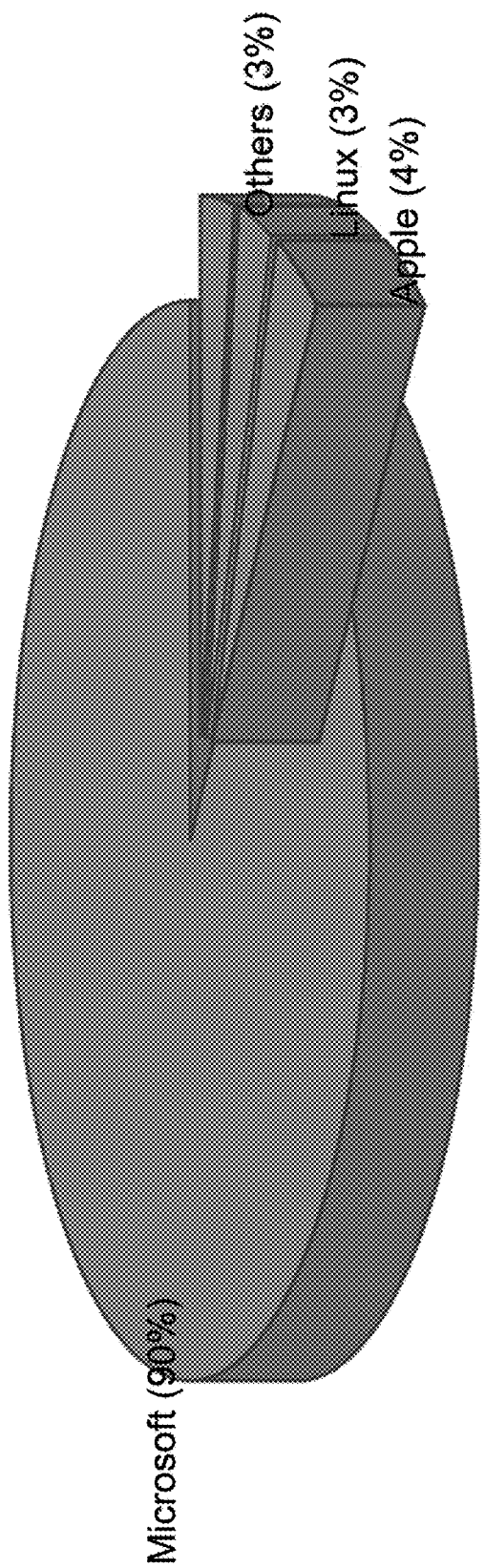
FIG. 4 is a graph illustrating a market share for operating systems according to various example embodiments.
Figure 5A:
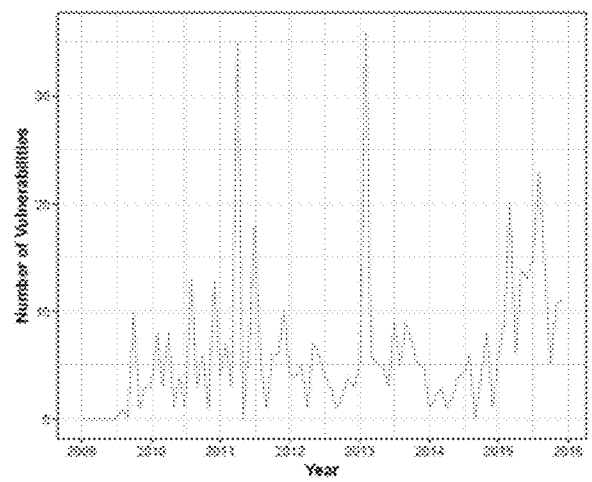
FIGS. 5A-F are graphs illustrating a number of vulnerabilities and a number of cumulative vulnerabilities for various operating systems according to various example embodiments.
Figure 5B:
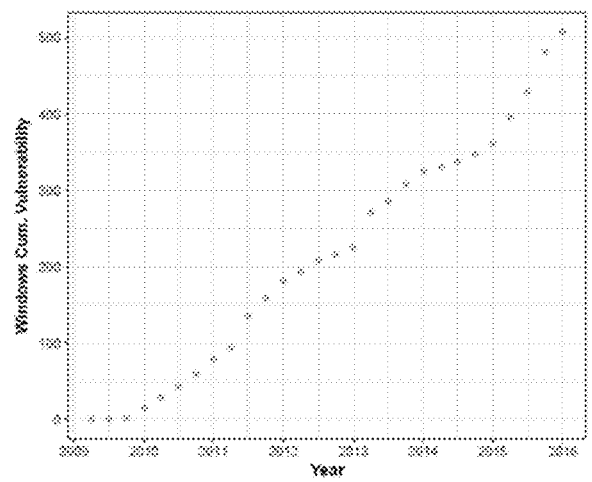
Figure 5C:
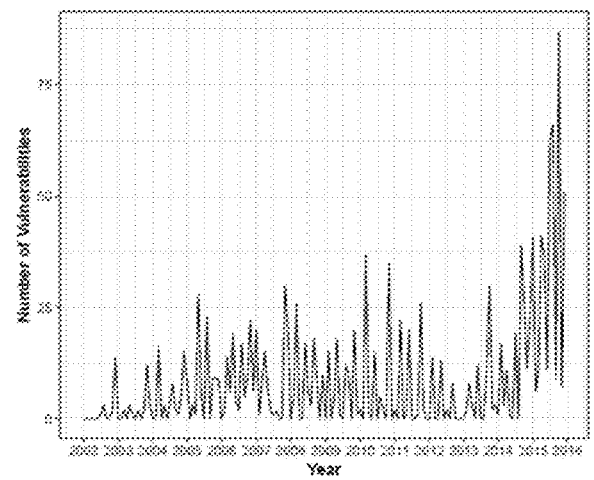
Figure 5D:
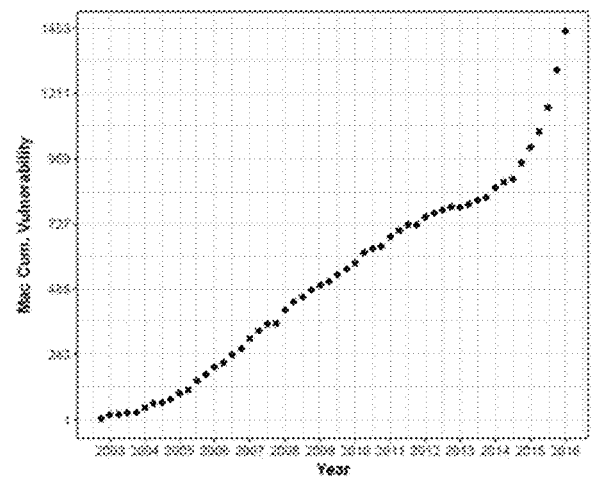
Figure 5E:
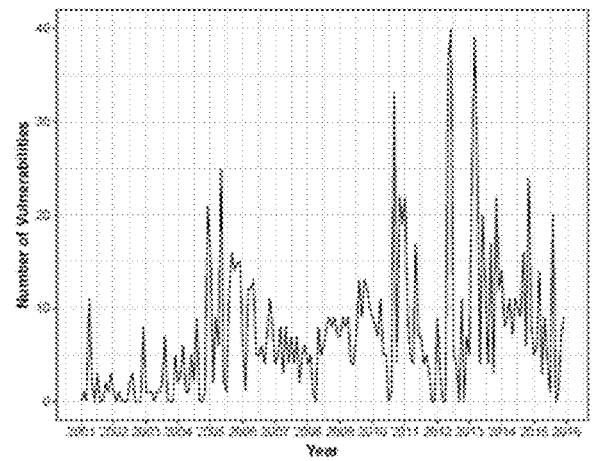
Figure 5F:
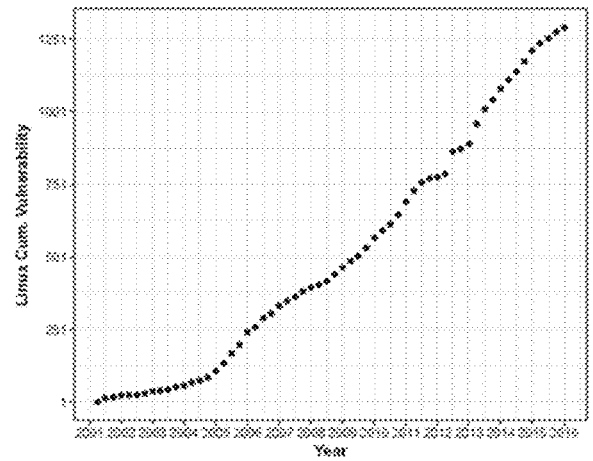

FIG. 4 gives a schematic view of the market share of Desktop OS worldwide, with Microsoft dominating the subject industry. Almost 90% of the market share of desktop Operating Systems is captured by Microsoft. Likewise, 4% of market share is captured by Apple and approximately 3% by Linux Kernel, which is graphically illustrated in FIG. 4. To be more precise, out of 90% of the market coverage of all Microsoft's existing Operating Systems, Windows 7 covers almost 48%. The only desktop Operating System developed by Apple is Mac OS X. On the other hand, Linux developed Linux Kernel, and it is considered to be one of the oldest Operating Systems. Linux Kernel has minimum market coverage, but it is still popular due to the availability of source code to the public. From aggregating the total market share of the three desktop Operating Systems, the three desktop OS cover most of the market share in the desktop environment. Thus, selecting Windows 7, Mac OS X, and Linux Kernel as a representative set of operating systems is appropriate. These Operating Systems are the product of three industry leaders: Microsoft, Apple, and Linux respectively.

With reference to FIGS. 5A-F, shown are six graphs illustrating a number of vulnerabilities and a cumulative number of vulnerabilities for each operating system. FIGS. 5A-B, FIGS. 5C-D, and FIGS. 5E-F correspond to two graphs each for Mac, Linux, and Windows respectively. The graphs in FIGS. 5A, 5C, and 5E display the number of vulnerabilities versus time on a monthly basis. The graphs show a completely nonlinear behavior with random fluctuations and irregular spikes. For linear (ARIMA) and nonlinear (ANN, SVM) time series models using monthly data, there is no influential trend or seasonality components.

A vulnerability application can be executed to forecast a number of vulnerabilities in software. The vulnerability application can include a customized model that captures the nonlinear behaviors. The existing vulnerability models use cumulative number of vulnerabilities with time as an independent variable. One of the goals can be to compare the PKT model with the existing ones. For uniformity, data can be structured in a cumulative quarterly basis. The graphs in FIGS. 5B, 5D, and 5F display the scatter plots of quarterly vulnerability data for the corresponding OS.

The vulnerability application can estimate a total cumulative vulnerability for the software. The vulnerability application can obtain vulnerability data from a vulnerability database for the software. The vulnerability application can estimate the total cumulative vulnerability of the software using the vulnerability data. The estimation of the total cumulative vulnerability can be based on a time based nonlinear differential equation model, such as, for example, the vulnerability model. The vulnerability model can include parameters incorporating a complete vulnerability life cycle. The vulnerability application can generate a graph displaying a cyclic increasing behavior of the complete vulnerability life cycle of the software. The vulnerability application can render the graph on a display.

The complete vulnerability life cycle of the software can include more than one partial life cycles. The partial life cycles can include time frames. The time frames can include an introduction phase, a growth phase, a mature phase, and potentially other phases. The vulnerability model can include a quadratic forcing term, integral coefficients, and potentially other elements. The vulnerability application can perform a remedial action if a vulnerability rate for the software exceeds a threshold level. As an example, a notification can be sent to a developer or company indicating that a prediction of future vulnerabilities will exceed the threshold. Further, resources can be allocated to address the increase in vulnerabilities before the vulnerabilities are released into the market.

The vulnerability model as proposed strongly captures the complicated linear and nonlinear behavior of the historically available data points and helps to predict future vulnerabilities. The vulnerability model can be compared with existing models based on Akaike Information Criteria (AIC) and goodness of fit test for all Operating Systems. The prediction accuracy was also noticeably higher for the vulnerability model. Based on the outcomes of the developed model, all the stakeholders associated with the Operating System will find this new vulnerability model as being significantly more important and useful. For software developers, they can evaluate and proceed with confidence with their strategic and operational policies. Software developers can make appropriate plans to allocate human and financial resources effectively and efficiently. Moreover, they can also make streamline patch decisions about the OS and utilize the outcomes for security testing procedures for the Operating System. Additionally, knowing the future vulnerabilities offers several benefits; one can identify the OS that is in need to be restricted to reduce vulnerabilities.

The vulnerability application can determine a predictive vulnerability score. The predictive vulnerability score can then be used for competitive market analysis, to monitor the behavior of competing OS using the forecasted vulnerability, and accordingly take appropriate actions. Most importantly, this information can be extremely relevant to the IT managers for their strategic planning to minimize the risk of a chosen OS that will not be exploited. Finally, the vulnerability model can offer a unique marketing strategy for purchasing the best OS available in the market place that will have the best (lowest number of) future vulnerabilities.

A number of vulnerability models have been proposed in the past to predict the number of vulnerabilities of a given OS: Musa-Okomoto Model, Anderson Thermodynamic Model, Rescorla Linear Model, Rescorla Exponential Model, and Alhazmi-Malaiya Logistic Model. The present disclosure develops a differential equation model approach that captures the rate of change of the total vulnerabilities discovered in three widely-used operating systems: Mac, Windows, and Linux. The existing models for software vulnerability have been developed based on some specific underlying assumptions and defined frameworks. An analytic model can be developed that more accurately captures the dynamics of the total cumulative vulnerabilities of a given OS. A new time-based nonlinear differential equation model, referred to herein as a vulnerability model is proposed. The results of the vulnerability model were compared with some of the existing models. The vulnerability model includes significant improvements in estimation and prediction performance.

The scatter plots in FIG. 5 show that, for the three different operating systems, the claim that vulnerability attains a saturation phase is not supported. For a particular time frame, the transition phases exist locally, but with the stability and continuity of the software, user base increases again and so does vulnerability. Thus, the combination of all these different transition phases and time frames makes a cyclic increasing behavior within the life span of the vulnerability life cycle.

The data indicates that there are two types of trends: one cyclic behavior and another steady increase. If $\Omega=\Omega(t)$ is the cumulative vulnerability counts at time t, then the vulnerability rate and its rate of change are given by $$\Omega'(t) \approx \frac{\Omega(t+h) - \Omega(t-h)}{2h} \text{ and } \Omega''(t) \approx \frac{\Omega'(t+h) - \Omega'(t-h)}{2h},$$

where h is the time step. The data set for $\Omega''(t)+\Omega(t)$ portrays a very strong quadratic behavior. So the vulnerability model can include a differential equation model of the form:

$$\Omega''(t)+\omega^2\Omega(t)=f(t), \quad (1)$$

with a quadratic forcing term $f(t)=At^2+Bt+C$, where $$\omega = \frac{2\pi}{T}$$

and T being the period that depends upon the data set considered. The complimentary solution of the homogeneous part of equation 1 is $\Omega_c(t)=c_1 \cos(\omega t)+c_2 \sin(\omega t)$, and the particular solution is $\Omega_p(t)=c_3 t^2+c_4 t+c_5$, where $$c_3 = \frac{A}{\omega^2}, c_4 = \frac{B}{\omega^2}, \text{ and } c_5 = \frac{C}{\omega^2} - \frac{2A}{\omega^4}.$$

Therefore, the general solution of the differential equation 1 is given by $$\Omega(t)=c_1 \cos(\omega t)+c_2 \sin(\omega t)+c_3 t^2 c_4 t\, c_5. \quad (2)$$

The vulnerability model can use an appropriate method based on the given data to estimate the values of the coefficients $c_1$, $c_2$, $c_3$, $c_4$, and $c_5$.

The solution of the differential equation (1), given by equation (2), can be the vulnerability model, which is named Pokhrel-Khanal-Tsokos Differential Equation Model (PKT Model). PKT analytical model can be used for estimating and predicting total cumulative software vulnerability. The vulnerability model can be applied to the available data for three operating systems: Mac OS X, Windows 7, and Linux Kernel.

The vulnerability model can be applied to the vulnerability data for all three major operating systems: Mac OS X, Windows 7, and Linux Kernel. The vulnerability model can be fit to the data with a 95% confidence band. The vulnerability model can be validated and compared with other existing models. The prediction accuracy of the vulnerability model can be determined using the available vulnerability data of all three major operating systems.

The vulnerability application can utilize the vulnerability data from the National Vulnerability Database (NVD). The NVD is the U.S. government's repository that integrates publicly available vulnerability resources and provides common references to the industry resources. The NVD is a product of the National Institute of Standards and Technology (NIST) Computer Security Division and is sponsored by the Department of Homeland Security's National Cyber Security Division. The NVD contains reported vulnerabilities based on their Common Vulnerabilities and Exposures (CVE) identifier. Each CVE is assigned a quantitative score to identify the severity level of the vulnerability that ranges from 0 to 10. Vulnerabilities for the three operating systems, Mac OS X, Linux Kernel, and Windows 7, were collected from the earliest reported date to December 2015. More specifically, the collection period of Mac OS X starts from 2002, Linux Kernel from 2001, and Windows 7 from 2009. According to the published date of the CVE, the quarterly sum of vulnerability counts were found. The vulnerability data of four quarters of 2016 were used as testing data to validate the vulnerability model.

According to one embodiment of the vulnerability model, $\Omega(t) = c_1 \cos(\omega t) + c_2 \sin(\omega t) + c_3 t^2 + c_4 t + c_5$, given in equation 2, $$\omega = \frac{2\pi}{T}$$

depends upon the time period T, and T depends on the data set. In one case, for the operating system Mac OS X, there are 54 quarterly data points. For one cycle, $$T = 54, \text{ and } \omega = \frac{2\pi}{54} \approx 0.116355283466;$$

for one and half cycles, $$T = 36, \text{ and } \omega = \frac{2\pi}{36} \approx 0.174532925199;$$

for two cycles, $$T = 27, \text{ and } \omega = \frac{2\pi}{27} \approx 0.232710566933;$$

and so on. For Mac OS X, just one cycle was considered for simplicity and $\omega \approx 0.116355283466$ was used in the vulnerability model.

Issues can be used to estimate the five integral coefficients $c_1, \ldots, c_5$ using a nonlinear approach. Like in linear regression, nonlinear regression provides estimated values of the coefficients based on the least square criterion. However, unlike linear regression, no explicit mathematical solution is available, and specific algorithms are needed to solve the minimization problem involving iterative numerical approximations. The estimated parameters can be obtained by minimizing the residual sum of squares (RSS) with respect to the unknown parameters. There is no explicit formula and procedure to estimate the unknown parameters of the vulnerability model. The vulnerability application can use a recursive method to estimate the parameters that best fits the given data. The iterative procedure demands starting values. To determine the best starting values and to avoid asymptotic behavior, the vulnerability application can use a linear time series approach by using total number of quarterly vulnerabilities as a response and time as a predictor variable. The starting value of the nonlinear regression can be set from the estimated value obtained from the linear time series method. The vulnerability application can achieve the convergence within two iterations in all cases.

By implementing the computational procedure mentioned above, the estimated values of the parameters were: $c_1 = 26656.79$, $c_2 = 32220.98$, $c_3 = 272.47$, $c_4 = -4033.11$, and $c_5 = -26376.42$. Therefore, the vulnerability model can provide the cumulative vulnerability behavior at any time t for Mac OS X a given by:

$$\Omega(t) = 26656.79 \cos(0.12t) + 32220.98 \sin(0.12t) + 272.47t^2 - 4033.11t - 26376.42 \quad (3)$$

Figure 6:
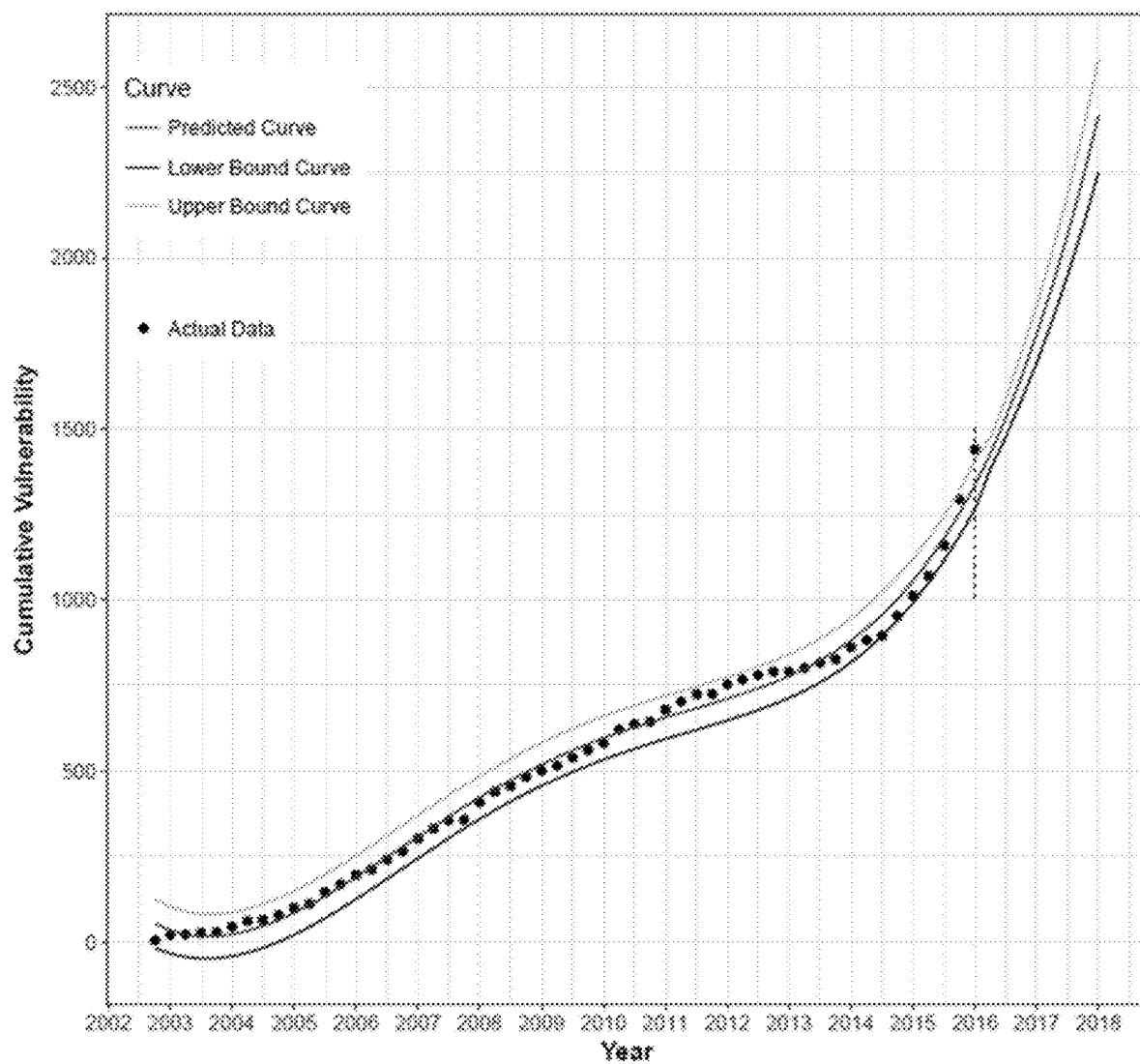
FIG. 6 is a graph illustrating a prediction of cumulative vulnerabilities in an operating system according to various example embodiments.

FIG. 6 exhibits the predicted 95% confidence band values of cumulative vulnerabilities given by the PKT analytical model in equation (3), along with the actual data points. The solid red curve represents the actual and predicted values by the vulnerability model. The black and green lines represent lower and upper 95% confidence of the true values. FIG. 6 shows a good fit within the given confidence limits except for one point in the fourth quarter of 2015. The total number of vulnerabilities in 2015 increased almost four times more than the previous year, which can be an extreme observation compared to the rest of the data set. One of the prominent reasons is due to the rapid market share gains of Mac OS X, which led to a growing attack surface for sensitive data. There were several malicious malware introduced in 2015. For instance, XcodeGhost inserts malicious components into the applications made with Xcode (Apple's official tool for developing IOS and OS Apps). Thus, using FIG. 6, for the last quarter of the year 2016, the cumulative vulnerability value was predicted to be 1775. Furthermore, the vulnerability application can determine with a 95% confidence band? that the true confidence level of Mac OS X will be greater than 1693 and less than 1860.

The fitted curve shows an increasing trend with increasing rate of cumulative vulnerabilities until 2008, followed by a slow growth until 2013, for Linux Kernel using the vulnerability model. The overall trend sharply increases from 2014 onwards. The dashed vertical line after 2015 displays the future prediction for the next two years. The AML model does not seem to fit the data because it demands stability for the entire vulnerability life cycle, which can be rarely seen in actual examples. RL and RE models are better suited to capture the trend than the AML model after 2014, but the vulnerability model can address these issues with excellent results. The vulnerability model can also be applied in developing the nonlinear models for Linux Kernel and Windows 7 OS. The final model for Linux and Windows 7 is given by the following equations:

$$\Omega(t)=1.13\cos(1.05t)+23.55\sin(1.05t)+3.97t^2+24.57t-71.04,$$

$$\Omega(t)=18.94\cos(1.15t)-27.79\sin(1.15t)+7.57t^2+4.54t+7.57.$$

Figure 7:
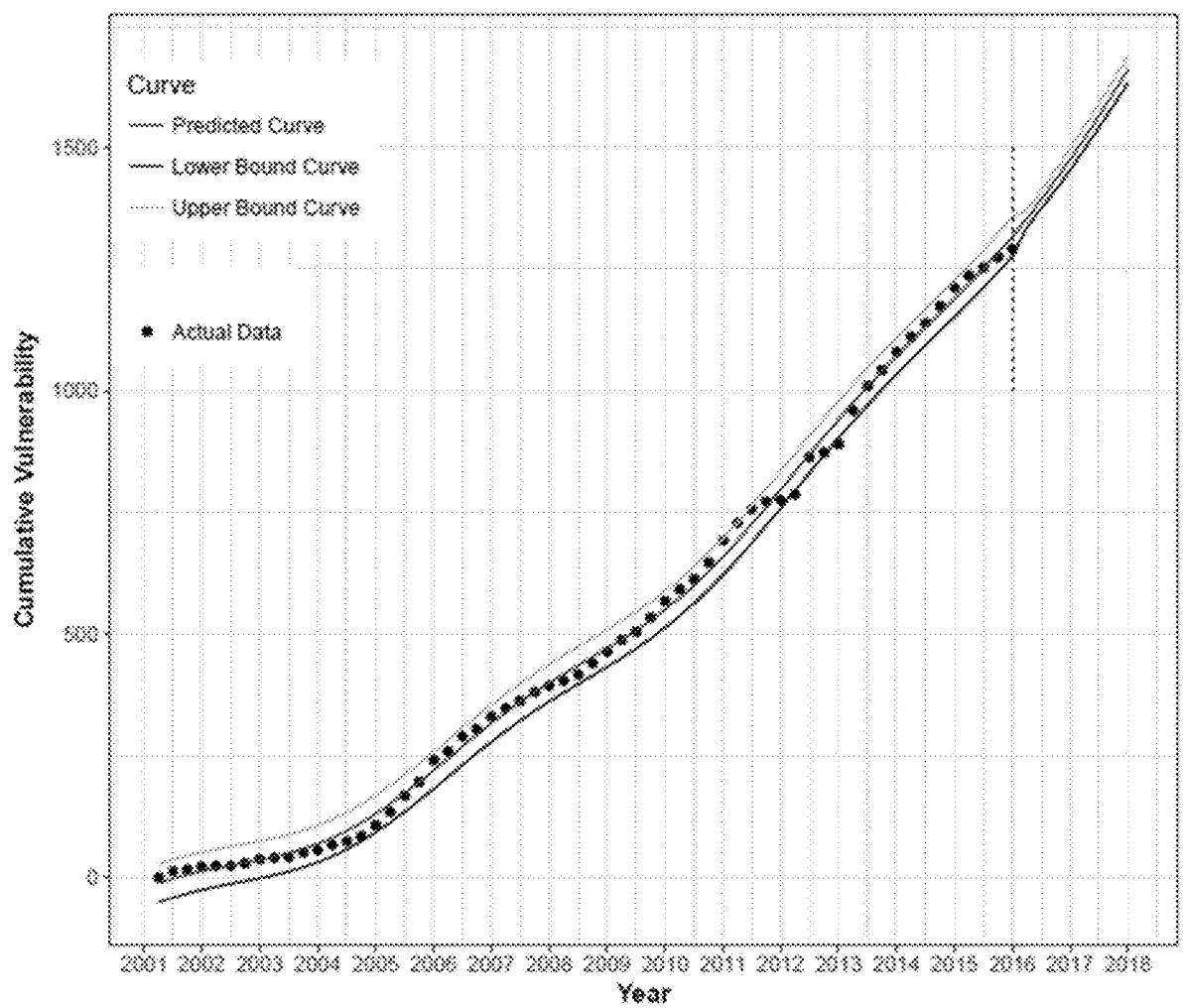
FIG. 7 is a graph illustrating a prediction of cumulative vulnerabilities in another operating system according to various example embodiments.
Figure 8:
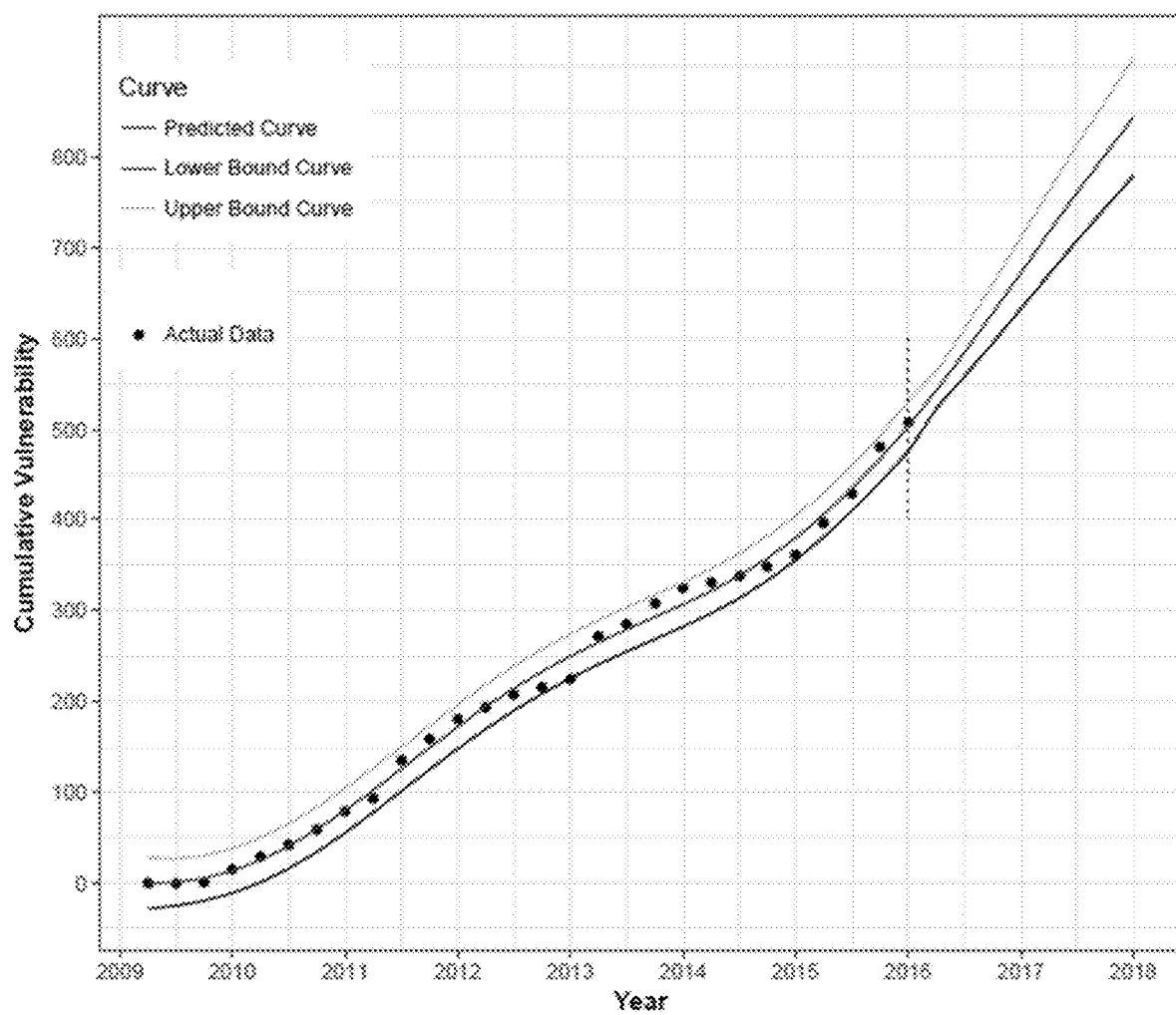
FIG. 8 is a graph illustrating a prediction of cumulative vulnerabilities in another operating system according to various example embodiments.

The fitted values given by the above models, together with cumulative vulnerability data and 95% confidence and prediction bands, are given in FIGS. 7 and 8.

Thus, using FIGS. 7 and 8, for the last quarter of 2016, the vulnerability application can predict that the cumulative vulnerability value to be 1475 and 672 respectively. Furthermore, the vulnerability application can display a 95% confidence that the true confidence level of Linux Kernel will be greater than 1453 and less than 1497, and the true confidence level of Windows 7 will be greater than 633 and less than 711.

Here, the vulnerability model can be compared with the other existing vulnerability discovery models, namely RL, RE, and AML. The same techniques of evaluating estimation of these parameters for the vulnerability model can be used to evaluate the parameters of the other models. The comparison can be based on Sum of Squares (RSS) and Akaike Information Criteria (AIC) which is defined by:

$$AIC=(-2\times\log Lik)+2P,$$

where log Lik represents log-likelihood value, and P is the number of parameters in the fitted model. The maximum likelihood estimates are used to calculate the weights of AIC. Lower AIC value indicates a better fit of the data. FIG. 9 lists RSS and AIC values for RL, RE, AML, and PKT models for all three operating systems. In each case, the PKT model depicts lower RSS and AIC values.

Figure 10:
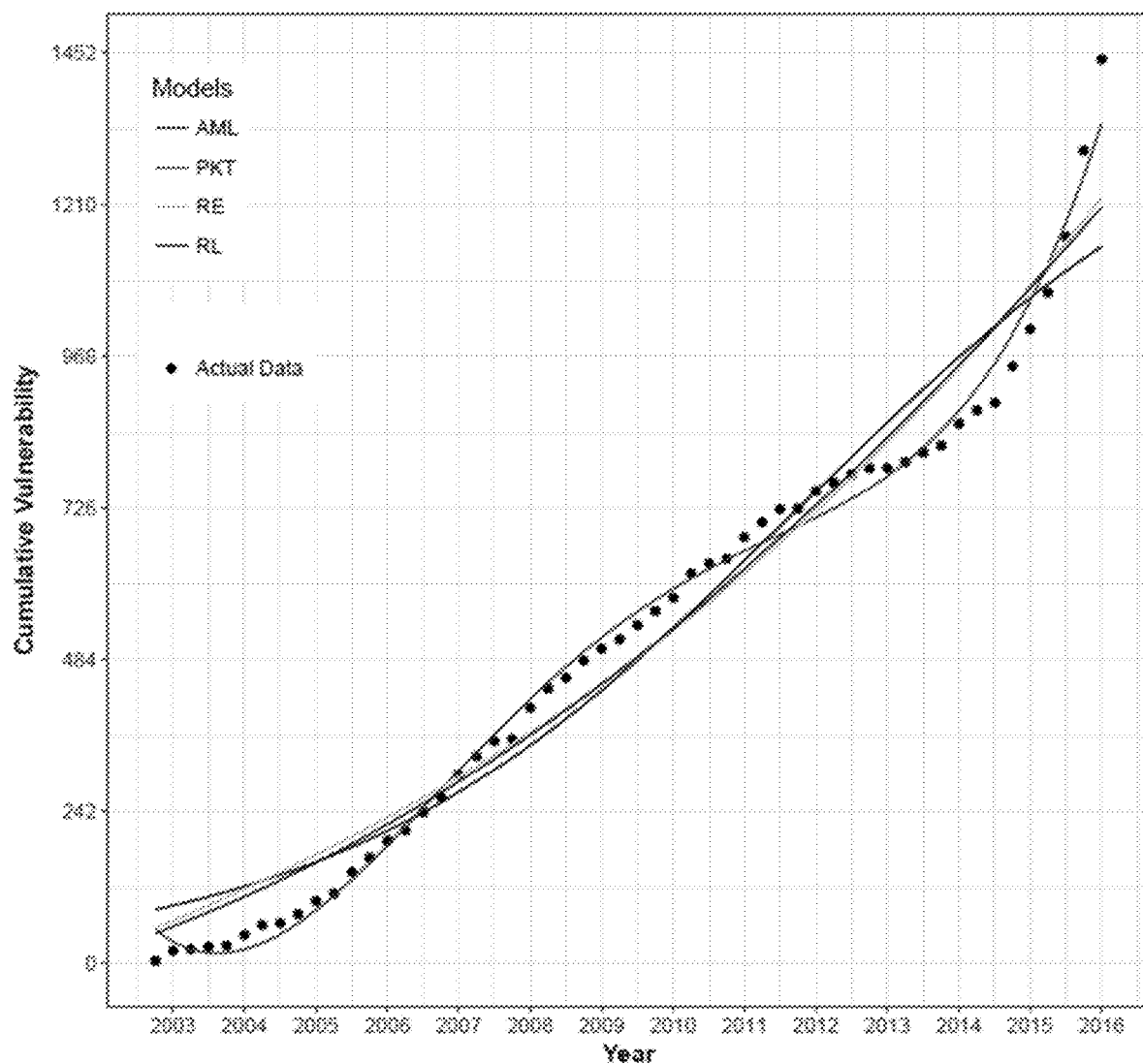
FIG. 10 is a graph illustrating a comparison of predictive models for cumulative vulnerabilities of an operating system according to various example embodiments.

The vulnerability model together with RL, RE, and AML are presented in FIG. 10 for Mac OS X. The curves in different colors represent the estimated fit of cumulative vulnerability data given by different models. A maximum likelihood estimate method was used to estimate the best fitting parameters for all models. The goodness of fit tests for different models are presented in FIG. 9.

In FIG. 10, the RL, RE, and AML predictions show overestimation of the cumulative vulnerability from 2003 to 2007, underestimation of the cumulative vulnerability from 2008 to 2012, and overestimation of the cumulative vulnerability again up to 2016. In contrast, the vulnerability model follows the actual data.

Figure 11:
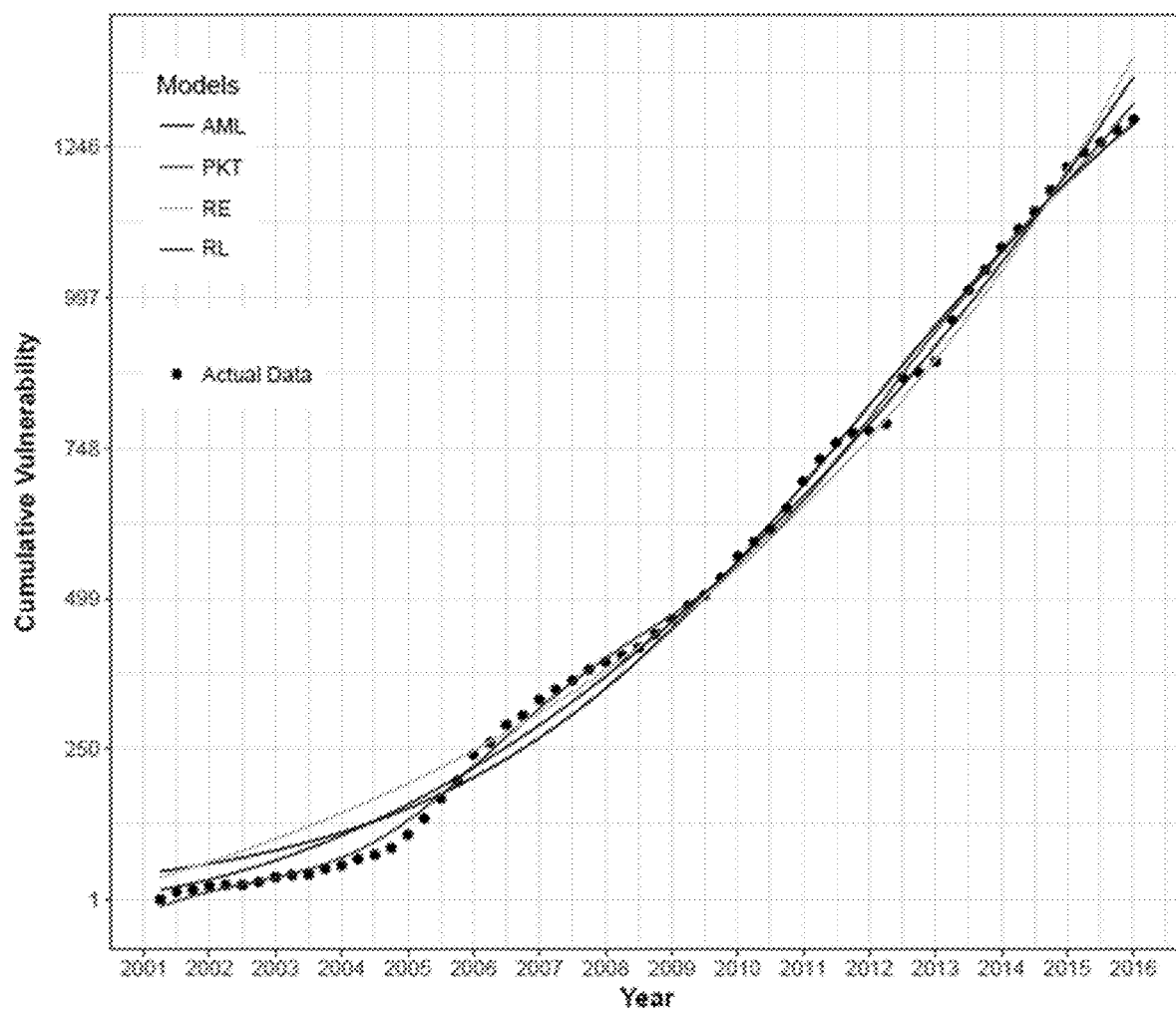
FIG. 11 is a graph illustrating a comparison of predictive models for cumulative vulnerabilities of another operating system according to various example embodiments.
Figure 12:
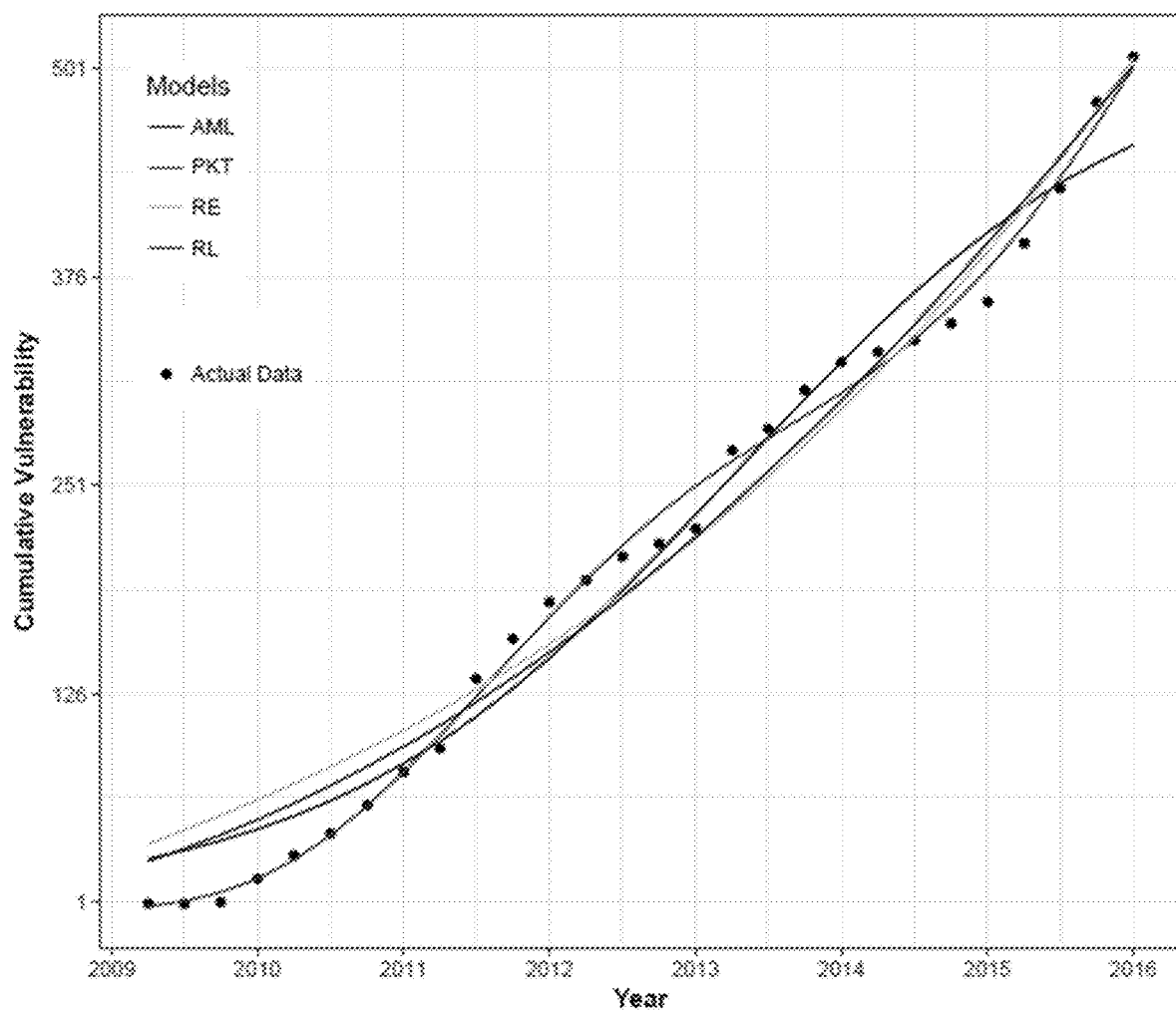
FIG. 12 is a graph illustrating a comparison of predictive models for cumulative vulnerabilities of another operating system according to various example embodiments.

A comparison of the vulnerability model with that of RL, RE, and AML, is presented in FIGS. 11 and 12 for Linux Kernel and Windows 7 respectively. The curves in different color represent estimated fit of cumulative vulnerability data given by different models. For Linux and Windows, the vulnerability model captures the cyclic trend better than the other models as shown in FIGS. 11 and 12. The variability of data is higher towards the right tail for all operating systems, and vulnerability model stands out to capture the trend.

The vulnerability model can make assumptions that are visually assessed through standardized residual plots and normal qq plots. In addition, a normal assumption of error can be evaluated through a Shapiro-Wilk goodness of fit test. FIG. 13 demonstrates that the vulnerability model strongly agrees with the normal assumptions of error.

The vulnerability application can utilize the Shapiro Wilk Test to assess whether or not residuals are normally distributed. The following hypothesis can be made:

$H_0$: Standardized Residuals are Normally Distributed.
$H_1$: Standardized Residuals are not Normally Distributed.

It can be assumed that an alpha level of 5%, i.e., if the P value of the Shapiro Wilk Test is below 0.05, null hypothesis is rejected. To verify normality of residuals, the null hypothesis should not be rejected. Similarly, a Shapiro-Wilk Test statistics value closer to 1 indicates better agreement to the normality assumptions. FIG. 13 demonstrates the Shapiro-Wilk Test statistics and the P value for each OS. In every case, null hypothesis is not rejected. This shows the strong statistical evidence that residuals produced by the vulnerability model can be normally distributed.

The vulnerability model for software vulnerability can be used to project the future vulnerability trends. The vulnerability application can implement one or more embodiments of the vulnerability model including as given in equation 2 among other models to estimate one or more cumulative vulnerability counts, such as, for example, for the four quarters of 2016 and the first two quarters of 2017 for all three operating systems: Mac, Linux, and Windows. The vulnerability model can be fitted using data up to the last quarter of 2015, and vulnerability counts of 2016 and 2017 can be estimated by using the fitted model. In one example, actual vulnerability data of 2016 and 2017 was used for validation purposes.

A nonlinear regression method does not have explicit prediction algorithms to predict future data. The vulnerability application can implement the bootstrap method to obtain prediction interval based on fitted value of nls( ) on some random sample re-sampled from the original one. From the bootstrapped fitted values and predictions, 90% predicted intervals are estimated. FIG. 14 presents the 90% predicted interval using the vulnerability model together with the actual vulnerability data for all three operating systems. It can be noted that the prediction interval in case of Linux changes in a linear fashion, whereas the other two operating systems do not exhibit a specific pattern. One of the reasons for this observation could be the choice of ω. The value of ω is determined based on the nature of the data itself, and the range of the prediction interval is influenced by ω.

FIG. 14 shows that the prediction is accurate for all quarters in the cases of Linux and Windows. The prediction for the first quarter of 2016, in the case of Mac OS X, is somewhat underestimated, but the prediction for the next three quarters are within the 90% confidence limit. The total number of the vulnerability in year 2015 is four times higher than in the previous year. One of the prominent reasons of higher vulnerability in 2015 is that there were defects in Apple's official tool that provides the framework to develop IOS and OS Apps. The defect on the framework itself caused the increase of the total number of vulnerabilities. The prediction results obtained by using the vulnerability model are found to be more accurate than those given by any other existing models.

The entries in the brackets correspond to lower and upper bounds of a 90% prediction interval for the four quarters of 2016. Information presented in FIG. 14 was utilized to compute Sum of Square Error (SSE) of the predicted vulnerability using the vulnerability model, and the SSE was compared to that of RL, RE, and AML models presented in FIG. 15.

On SSE scale of Linux Kernel OS, the vulnerability model gives the best SSE of 1603, followed by RL at 4259.33, AML at 13710, and RE model at 13839.3. Similarly, in case of Windows 7 OS, SSE of vulnerability model is 63.33, followed by RE at 109.67, RL at 179.33, and AML model at 17494.67. Finally, for Mac OS X OS, PKT model yields SSE of 2185, followed by RE at 128300.3, RL at 151149, and AML at 260835.3. In all OS, the vulnerability model has a lower SSE in terms of predictive capabilities. Hence, the vulnerability model stands out best not only in fitting but also for prediction purposes among other models presented in this research.

The vulnerability application can include an effective differential equation model for software vulnerabilities by utilizing the vulnerability datasets of the three major OS: Windows 7, Linux Kernel, and Mac OS X. The vulnerability model is better than the existing models in terms of excellent fitting and prediction accuracy. The vulnerability model can be implemented in the vulnerability application for use by developers, user communities, and individual organizations to predict vulnerability levels of their software. The vulnerability application can examine the software readiness by predicting the future vulnerability trend. Based on the projected vulnerabilities, the vulnerability application can allocate the security maintenance resources to detect the forthcoming vulnerabilities. At the same time, the vulnerability application can be used to plan software security patches. The vulnerability application can compare different software of particular domains in terms of risk with its vulnerability. The vulnerability application can access the risk before patches are applied. Similarly, every organization has its own customized security policies that require allocation of time and resources. The vulnerability application can be used to provide quantitatively guidelines for such policies.

The vulnerability application can provide a number of contributions to different stakeholders. The vulnerability application can analyze publicly reported vulnerabilities in the National Vulnerability Database without consideration of unreported/undisclosed vulnerabilities. All vulnerabilities can be treated equally. Moreover, most models do not consider code reuse and overlap among the consecutive versions of the software. The vulnerability model can consider the versions of the software independently. Vulnerability present in one version may also be present in another version.

Figure 16:
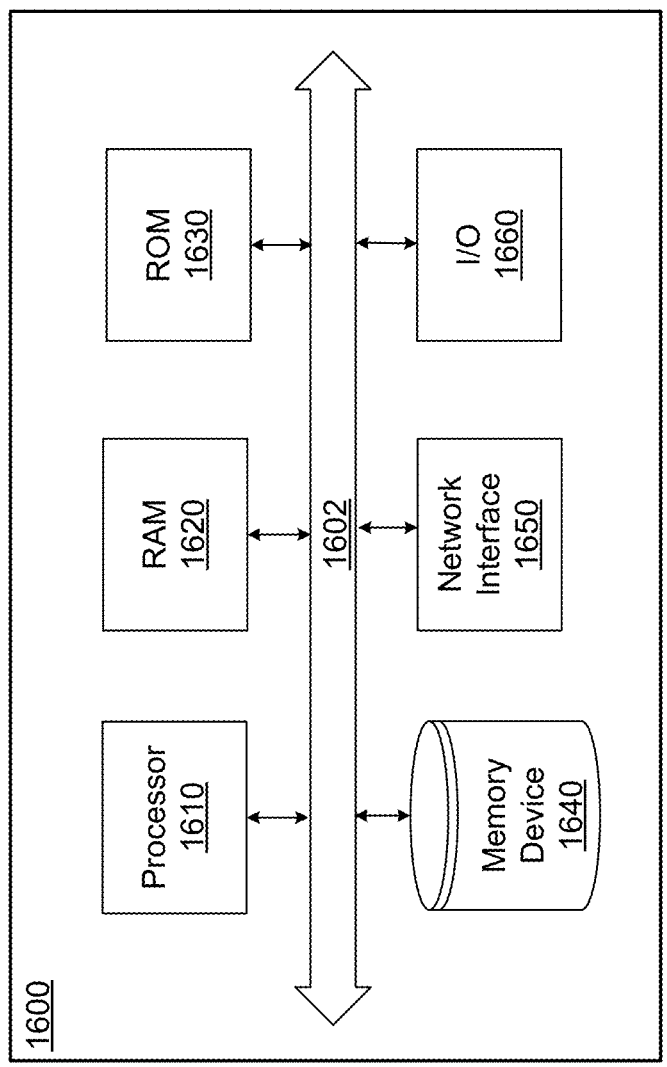
FIG. 16 is a schematic block diagram that illustrates an example computing device employed according to various embodiments.

Turning to FIG. 16, an example hardware diagram of a computing device 1600 is illustrated. The vulnerability application may be implemented, in part, using one or more elements of the computing device 1600. The computing device 1600 can include one or more of a processor 1610, a Random Access Memory ("RAM") 1620, a Read Only Memory ("ROM") 1620, a memory device 1640, a network interface 1650, and an Input Output ("I/O") interface 1660. The elements of the computing device 1600 are communicatively coupled via a local interface 1602.

The processor 1610 comprises an arithmetic processor or Application Specific Integrated Circuit ("ASIC"). The RAM 1620 and ROM 1630 include random access or read only memory devices that stores computer-readable instructions to be executed by the hardware processor 1610. The memory device 1640 stores computer-readable instructions thereon that, when executed by the processor 1610, direct the processor 1610 to execute various aspects of the present disclosure described herein. When the processor 1610 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 1640 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 1650 comprises hardware interfaces to communicate over data networks. The I/O interface 1660 comprises device input and output interfaces such as keyboard, pointing device, display, communication, and other interfaces. The local interface 1602 electrically and communicatively couples the processor 1610, the RAM 1620, the ROM 1630, the memory device 1640, the network interface 1650, and the I/O interface 1660, so that data and instructions may be communicated among them.

In operation, the processor 1610 is configured to retrieve computer-readable instructions stored on the memory device 1640, the RAM 1620, the ROM 1630, or another storage means, and copy the computer-readable instructions to the RAM 1620 or the ROM 1630 for execution, for example. The processor 1610 is further configured to execute the computer-readable instructions to implement various aspects and features of the present disclosure. For example, the processor 1610 may be adapted and configured to execute the processes described above, including the processes described as being performed by the vulnerability application. Also, the memory device 1640 may store the data stored and used by the vulnerability application.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Therefore, at least the following is claimed:

1. A method implemented by at least one computing device executing instructions to estimate a total cumulative vulnerability for a software, the method comprising:

obtaining, by the at least one computing device, vulnerability data for a particular time period from a vulnerability database for the software;

estimating, by the at least one computing device, the total cumulative vulnerability of the software using the vulnerability data for the particular time period based at least in part on a time based nonlinear differential equation model and iterative identification of at least one unknown coefficient parameter of the time based nonlinear differential equation model without an explicit formula for the at least one unknown coefficient parameter, the time based nonlinear differential equation model generating a complete vulnerability life cycle corresponding to a plurality of cumulative vulnerabilities for a plurality of times comprising a predictive cumulative vulnerability for a future time within a future partial life cycle beyond the particular time period; and automatically generating, by the at least one computing device, a graph displaying a cyclic increasing behavior of the complete vulnerability life cycle of the software wherein the future partial life cycle shows at least a portion of the cyclic increasing behavior.

2. The method of claim 1, wherein the complete vulnerability life cycle of the software comprises a plurality of partial life cycles.

3. The method of claim 2, wherein individual ones of the plurality of partial life cycles comprises a respective time frame, the respective time frame comprising an introduction phase, a growth phase, and a mature phase.

4. The method of claim 1, wherein the model comprises a quadratic forcing term.

5. The method of claim 1, wherein the model comprises integral coefficients.

6. The method of claim 1, further comprising determining a vulnerability rate for the software based on the total cumulative vulnerability.

7. The method of claim 6, further comprising performing a remedial action in response to the vulnerability rate exceeding a threshold level.

8. A system to estimate a total cumulative vulnerability for a software, comprising:
 a memory device configured to store computer-readable instructions thereon; and
 at least one computing device comprising at least one processing device directed, through execution of the computer-readable instructions, to:
  obtain, by the at least one computing device, vulnerability data for a particular time period from a vulnerability database for the software;
  estimate, by the at least one computing device, the total cumulative vulnerability of the software using the vulnerability data for the particular time period based at least in part on a time based nonlinear differential equation model and iterative identification of at least one coefficient parameter of the time based nonlinear differential equation model, the time based nonlinear differential equation model generating a complete vulnerability life cycle that includes a plurality of partial life cycles comprising a future partial life cycle beyond the particular time period; and
  automatically generate, by the at least one computing device, a graph displaying a cyclic increasing behavior of the complete vulnerability life cycle of the software wherein the future partial life cycle shows at least a portion of the cyclic increasing behavior.

9. The system of claim 8, wherein the complete vulnerability life cycle of the software comprises a plurality of partial life cycles.

10. The system of claim 9, wherein individual ones of the plurality of partial life cycles comprises a respective time frame, the respective time frame comprising an introduction phase, a growth phase, and a mature phase.

11. The system of claim 8, wherein the time based nonlinear differential equation model comprises a quadratic forcing term.

12. The system of claim 8, wherein the time based nonlinear differential equation model comprises integral coefficients.

13. The system of claim 8, wherein through execution of the computer-readable instructions, the at least one processing device is further directed to:
 determine a vulnerability rate for the software based on the total cumulative vulnerability.

14. The system of claim 13, wherein through execution of the computer-readable instructions, the at least one processing device is further directed to:
 perform a remedial action in response to the vulnerability rate exceeding a threshold level.

15. A non-transitory computer readable medium comprising executable instructions that when executed cause a computing device to at least:
 obtain, by the computing device, vulnerability data for a particular time period from a vulnerability database for software;
 estimate, by the computing device, a total cumulative vulnerability of the software using the vulnerability data for the particular time period based at least in part on a time based nonlinear differential equation model and iterative identification of at least one coefficient parameter of the time based nonlinear differential equation model, the time based nonlinear differential equation model generating a complete vulnerability life cycle that includes a plurality of partial life cycles comprising a future partial life cycle beyond the particular time period; and
 automatically generate, by the computing device, a graph displaying a cyclic increasing behavior of the complete vulnerability life cycle of the software wherein the future partial life cycle shows at least a portion of the cyclic increasing behavior.

16. The non-transitory computer readable medium of claim 15, wherein the complete vulnerability life cycle of the software comprises a plurality of partial life cycles.

17. The non-transitory computer readable medium of claim 16, wherein individual ones of the plurality of partial life cycles comprises a respective time frame, the respective time frame comprising an introduction phase, a growth phase, and a mature phase.

18. The non-transitory computer readable medium of claim 15, wherein the time based nonlinear differential equation model comprises a quadratic forcing term.

19. The non-transitory computer readable medium of claim 15, wherein the time based nonlinear differential equation model comprises integral coefficients.

20. The non-transitory computer readable medium of claim 15, wherein execution of the computer-readable instructions further causes the computing device to at least:
 determine a vulnerability rate for the software based on the total cumulative vulnerability; and
 perform a remedial action based on the vulnerability rate exceeding a threshold level.

* * * * *